US012704754B2

(12) United States Patent
Zeng et al.

(10) Patent No.: US 12,704,754 B2
(45) Date of Patent: Aug. 11, 2026

(54) LIQUID CRYSTAL GRATING AND DISPLAY DEVICE

(71) Applicant: Shanghai Tianma Microelectronics Co., Ltd., Shanghai (CN)

(72) Inventors: Yang Zeng, Shanghai (CN); Yuan Ding, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 228 days.

(21) Appl. No.: 18/586,878

(22) Filed: Feb. 26, 2024

(65) Prior Publication Data

US 2024/0192550 A1 Jun. 13, 2024

(30) Foreign Application Priority Data

Nov. 17, 2023 (CN) ........................ 202311545782.2

(51) Int. Cl.
*G02F 1/13363* (2006.01)
*G02F 1/1335* (2006.01)

(52) U.S. Cl.
CPC .. *G02F 1/133637* (2021.01); *G02F 1/133504* (2013.01); *G02F 1/133512* (2013.01); *G02F 2201/305* (2013.01); *G02F 2203/055* (2013.01); *G02F 2203/12* (2013.01)

(58) Field of Classification Search
CPC ......... G02F 1/133637; G02F 1/133504; G02F 1/133512
See application file for complete search history.

(56) References Cited

U.S. PATENT DOCUMENTS

2013/0293818 A1* 11/2013 Murata ............ G02F 1/133707 349/141

* cited by examiner

*Primary Examiner* — James A Dudek
(74) *Attorney, Agent, or Firm* — KDW FIRM PLLC

(57) ABSTRACT

Provided are a liquid crystal grating and a display device. The liquid crystal grating is configured to modulate incident light beams of multiple colors. The light beams include first color light. The liquid crystal grating includes a first substrate, a liquid crystal layer and a second substrate. The liquid crystal layer is located between the first substrate and the second substrate and includes multiple liquid crystal molecules. The liquid crystal grating satisfies that $\Delta n_1 \times d < \lambda_1$, where $\Delta n_1$ denotes a refractive index difference of birefringence of the liquid crystal molecules corresponding to the first color light, d denotes the thickness of the liquid crystal layer along the direction perpendicular to a plane on which the first substrate is located, and $\lambda_1$ denotes the center wavelength of the first color light.

20 Claims, 4 Drawing Sheets

F1/T
F2/T
SLM
R
G
B
R
G
B
T2/T0
T3/T0
T1/T0
LCG
G
B
R
G
B
R
t2
t3
t1
BL
G-on
B-on
R-on
G-on
B-on
R-on

F1/T
F2/T
SLM
R
G
B
LCG
G
B
R
BL
G-on
B-on
R-on
x2
x1

F1/T
F2/T
SLM
LCG
T12/t1
BL
G-on
B-on
R-on
T21
T22
T11

LIQUID CRYSTAL GRATING AND DISPLAY DEVICE

CROSS-REFERENCE TO RELATED APPLICATION(S)

This application claims priority to Chinese Patent Application No. 202311545782.2 filed with the China National Intellectual Property Administration (CNIPA) on Nov. 17, 2023, the disclosure of which is incorporated herein by reference in its entirety.

TECHNICAL FIELD

The present disclosure relates to the field of display technologies and, in particular, to a liquid crystal grating and a display device.

BACKGROUND

In an existing naked-eye three-dimensional display device, the transmission direction of a light beam is generally modulated by a liquid crystal grating so that a left-eye image and a right-eye image are formed and transmitted to human eyes. In a three-dimensional display, one image frame needs to be modulated twice to form the left-eye image and the right-eye image respectively, and red, green and blue light beams need to be modulated for a colorful display, so the operation frequency of the liquid crystal grating is very high.

However, the existing liquid crystal grating has an insufficient response, thereby affecting the display effect.

SUMMARY

The present disclosure provides a liquid crystal grating and a display device to increase the response speed of the liquid crystal grating so that the display effect can be improved.

An embodiment of the present disclosure provides a liquid crystal grating configured to modulate incident light beams of multiple colors. The light beams include first color light.

The liquid crystal grating includes a first substrate, a liquid crystal layer and a second substrate, and the liquid crystal layer is located between the first substrate and the second substrate and includes multiple liquid crystal molecules.

The liquid crystal grating satisfies that $\Delta n_1 \times d < \lambda_2$.

$\Delta n_1$ denotes a refractive index difference of birefringence of the liquid crystal molecules corresponding to the first color light, d denotes a thickness of the liquid crystal layer along a direction perpendicular to a plane on which the first substrate is located, and $\lambda_1$ denotes a center wavelength of the first color light.

An embodiment of the present disclosure provides a display device. The display device includes a light resource and at least one liquid crystal grating. The at least one liquid crystal grating is configured to modulate incident light beams of multiple colors. The light beams include first color light. Each liquid crystal grating includes a first substrate, a liquid crystal layer and a second substrate, and the liquid crystal layer is located between the first substrate and the second substrate and includes multiple liquid crystal molecules. Each liquid crystal grating satisfies that $\Delta n_1 \times d < \lambda_2$. $\Delta n_1$ denotes a refractive index difference of birefringence of the liquid crystal molecules corresponding to the first color light, d denotes a thickness of the liquid crystal layer along a direction perpendicular to a plane on which the first substrate is located, and $\lambda_1$ denotes a center wavelength of the first color light.

The light source is configured to chronologically emit the coherent light beams of multiple colors.

It is to be understood that the content described in this section is neither intended to identify key or critical features of the embodiments of the present disclosure nor intended to limit the scope of the present disclosure. Other features of the present disclosure become easily understood through the description provided hereinafter.

BRIEF DESCRIPTION OF DRAWINGS

To illustrate the technical schemes in the embodiments of the present disclosure or the technical schemes in the related art more clearly, drawings used in the description of the embodiments or the related art will be briefly described below. Apparently, though the drawings described below illustrate part of embodiments of the present disclosure, those skilled in the art may expand and extend to other structures and drawings according to the basic concepts of the device structure, driving method, and manufacturing method disclosed and indicated in the embodiments of the present disclosure. These are undoubtedly all within the scope of the claims of the present disclosure.

DETAILED DESCRIPTION

In order that the objects, technical schemes and advantages of the present disclosure are clearer, the technical schemes of the present disclosure are described more clearly and completely hereinafter with reference to drawings of embodiments of the present disclosure and in conjunction with implementations. Apparently, the embodiments described herein are some embodiments, not all embodiments, of the present disclosure. All other embodiments obtained by those skilled in the art based on the basic concepts disclosed and indicated in the embodiments of the present disclosure are within the scope of the present disclosure.

Figure 1:
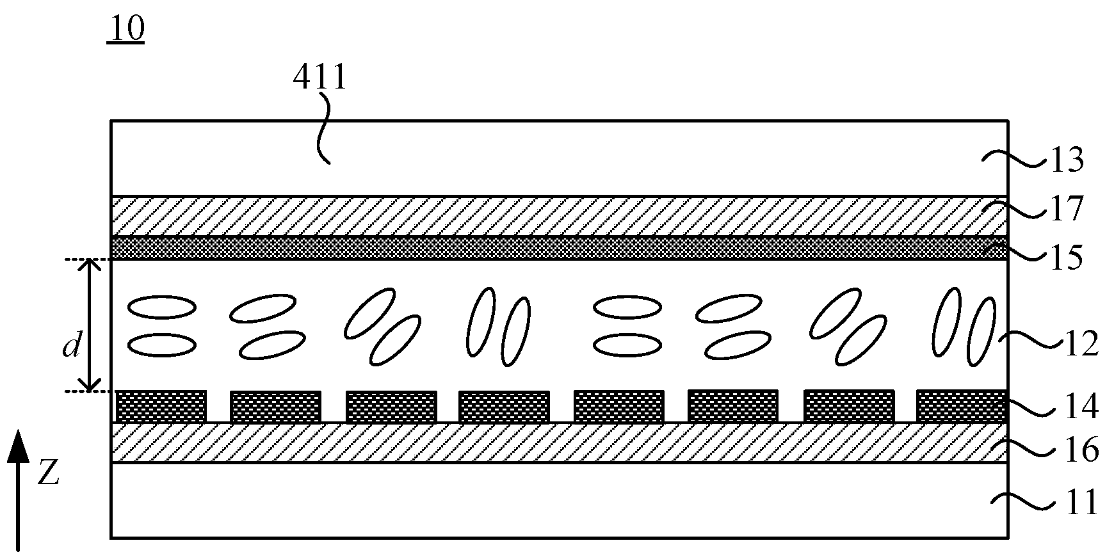
FIG. 1 is a cross-sectional diagram of a liquid crystal grating according to an embodiment of the present disclosure.

FIG. 1 is a cross-sectional diagram of a liquid crystal grating according to an embodiment of the present disclosure. As shown in FIG. 1, the liquid crystal grating is configured to modulate incident light beams of multiple colors. The light beams include first color light. The liquid crystal grating 10 includes a first substrate 11, a liquid crystal layer 12 and a second substrate 13, and the liquid crystal layer 12 is located between the first substrate 11 and the second substrate 13. The liquid crystal layer 12 includes multiple liquid crystal molecules. The multiple liquid crystal molecules may be either positive liquid crystal molecules or negative liquid crystal molecules. The liquid crystal grating 10 satisfies that $\Delta n_1 \times d < \lambda_2$, where $\Delta n_1$ denotes a refractive index difference of birefringence of the liquid crystal molecules corresponding to the first color light, d denotes the thickness of the liquid crystal layer 12 along the direction Z perpendicular to a plane on which the first substrate 11 is located, and $\lambda_1$ denotes the center wavelength of the first color light. The refractive index difference of birefringence of the liquid crystal molecules corresponding to the first color light is a difference between a long-axis refractive index and a short-axis refractive index of the liquid crystal molecules corresponding to the first color light.

It is to be understood that when an electronic device with a holographic display function displays an image, after light signals of the light beams of multiple colors are subjected to phase and amplitude modulation by a spatial light modulator (SLM), a left-eye image and a right-eye image are generally formed through a diffraction function of the liquid crystal grating 10.

With continued reference to FIG. 1, the light crystal grating 10 may further include a first electrode 14 and a second electrode 15. The first electrode 14 is located between the first substrate 11 and the liquid crystal layer 12, and the second electrode 15 is located between the liquid crystal layer 12 and the second substrate 13. Further, a first dielectric layer 16 between the first substrate 11 and the first electrode 14 may be included, and a second dielectric layer 17 between the second electrode 15 and the second substrate 13 may be included. The first dielectric layer 16 and the second dielectric layer 17 are disposed so that the liquid crystal grating 10 can be protected from being damaged by the external environment and charges between electrodes can be effectively isolated to prevent charge leakage and electric arcs, thereby ensuring the normal operation of the liquid crystal grating 10. Multiple first electrodes 14 may be provided independently, and the second electrode 15 may be a whole-surface electrode.

When a voltage difference exists between the first electrode 14 and the second electrode 15, a longitudinal electric field is formed between the first electrode 14 and the second electrode 15, and the multiple liquid crystal molecules in the liquid crystal layer 12 may be driven to rotate so that the light beams incident on the liquid crystal grating 10 can be deflected.

Since the maximum phase adjustable by the liquid crystal grating 10 on the light beam is greater than 2π, the thickness (which is also referred to as the thickness of a liquid crystal cell) of the liquid crystal layer 12 in the liquid crystal grating 10 is too large. In addition, the viscosity of liquid crystal molecules is also relatively large. As a result, the response speed of the liquid crystal grating 10 decreases. To increase the response speed of the liquid crystal grating 10, the thickness of the liquid crystal layer 12 needs to be reduced. The thickness of the liquid crystal layer 12 is positively proportional to the phase adjustment range of the liquid crystal grating 10, so a reduction in the thickness of the liquid crystal layer 12 reduces the phase adjustment range of the liquid crystal grating 10. For light beams of different colors, due to different corresponding wavelengths, when the liquid crystal grating 10 performs the phase adjustment on the light beams of different wavelengths, the maximum reachable phases are also different, and the maximum phase may be denoted as $$\frac{2\pi \times \Delta n \times d}{\lambda},$$

where Δn denotes a refractive index difference of birefringence of the liquid crystal molecules corresponding to certain color light, and λ denotes the center length of the certain color light. Therefore, the maximum phase adjustable by the liquid crystal grating 10 on the light beam of a certain color may be set to be less than 2π, that is, $$\frac{2\pi \times \Delta n \times d}{\lambda}$$

is less than 2π, to reduce the thickness of the liquid crystal layer 12 so as to increase the response speed of the liquid crystal grating 10.

The incident light beams of the multiple colors that are modulated by the liquid crystal grating 10 may include the first color light. The first color light may have a relatively large wavelength among the light beams of the multiple colors. The first color light includes, but is not limited to, red light, orange light, yellow light, or the like so that the phase range of the color light of the relatively large wavelength adjusted by the liquid crystal grating 10 can be the minimum, thereby ensuring that the phase range of other color light adjusted by the liquid crystal grating 10 can be greater than the phase adjustment range of the first color light. For example, the first color light is red light, in this manner, for the first color light, the liquid crystal grating 10 may be set to satisfy that $$\frac{2\pi \times \Delta n_1 \times d}{\lambda_1} < 2\pi.$$

Therefore, $\Delta n_1 \times d < \lambda_1$ may be further obtained, where $\Delta n_1$ denotes the refractive index difference of birefringence of the liquid crystal molecules corresponding to the first color light, d denotes the thickness of the liquid crystal layer along the direction perpendicular to the plane on which the first substrate 11 is located, $\lambda_1$ denotes the center wavelength of the first color light so that the maximum phase adjustable by the liquid crystal grating 10 on the first color light of the wavelength of $\lambda_1$ can be less than 2π. Compared with the general configuration of the maximum phase being greater than 2π, the liquid crystal layer 12 may have a smaller thickness so that the overall thickness of the liquid crystal grating can be reduced, and the response speed of the liquid crystal grating 10 can be increased, thereby improving the display effect.

The liquid crystal grating includes the first substrate, the liquid crystal layer and the second substrate, and the liquid crystal layer is located between the first substrate and the second substrate and includes multiple liquid crystal molecules. When the multiple liquid crystal molecules in the liquid crystal layer are driven to rotate, the light beams incident on the liquid crystal grating can be deflected. The liquid crystal grating satisfies that $\Delta n_1 \times d < \lambda_1$, where $\Delta n_1$ denotes the refractive index difference of birefringence of the liquid crystal molecules corresponding to the first color light, d denotes the thickness of the liquid crystal layer along the direction perpendicular to the plane on which the first substrate is located, and $\lambda_1$ denotes the center wavelength of the first color light. That is, the maximum phase adjustable by the liquid crystal grating on the first color light is set to be less than 2π. Therefore, compared with the general configuration of the maximum phase being greater than 2π, the liquid crystal layer may have a smaller thickness so that the overall thickness of the liquid crystal grating can be reduced, and the response speed of the liquid crystal grating can be increased, thereby improving the display effect.

In an embodiment, referring to FIG. 1, $2\ \mu m \le d \le 5\ \mu m$, and the value of the thickness d of the liquid crystal layer 12 along the direction Z perpendicular to the plane on which the first substrate 11 is located may be set according to actual situations.

In an embodiment, with continued reference to FIG. 1, the liquid crystal grating 10 satisfies that $0.85\lambda_1 < \Delta n_1 \times d < 0.95\lambda_1$.

It is to be understood that when the maximum phase adjustable by the liquid crystal grating 10 on the first color light is greater than 2π, a proper voltage may be selected so that the liquid crystal grating 10 can form a linear phase gradient from 0 to 2π, thereby achieving 100% diffraction efficiency. However, when the maximum phase adjustable by the liquid crystal grating 10 on the first color light is less than 2π, the diffraction efficiency of the first color light can be reduced. It is to be noted that the diffraction efficiency refers to the ratio of the intensity of diffracted light at infinity to the intensity of incident light at a set level. The set level may be, for example, +1 level.

Figure 2:
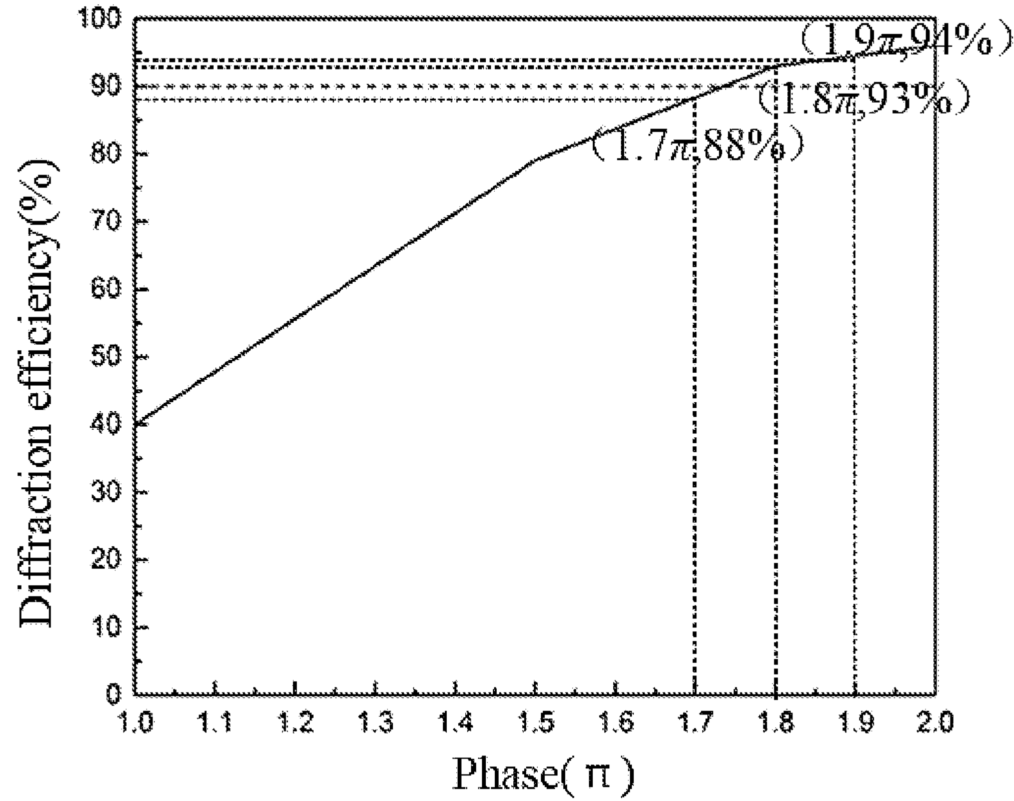
FIG. 2 is a graph of a phase and a diffraction efficiency of first color light according to an embodiment of the present disclosure.

The first color light is the red light. FIG. 2 is a graph of a phase and a diffraction efficiency of first color light according to an embodiment of the present disclosure. In conjunction with FIGS. 1 and 2, it can be seen from FIG. 2 that the larger the phase adjustable by the liquid crystal grating 10 on the first color light, the higher the diffraction efficiency. To increase the response speed of the liquid crystal grating 10, the thickness of the liquid crystal layer 12 along the direction Z perpendicular to the plane on which the first substrate 11 is located needs to be reduced, that is, the maximum phase adjusted by the liquid crystal grating 10 on the first color light is less than 2π, so the diffraction efficiency is reduced. When the phase is 1.9π, the diffraction efficiency of the liquid crystal grating 10 on the first color light is 94%, so the liquid crystal grating 10 may satisfy that $$\frac{2\pi \times \Delta n_1 \times d}{\lambda_1} < 1.9\pi,$$

that is, $\Delta n_1 \times d < \lambda_1$, and it can be ensured that the liquid crystal grating still has a very high diffraction efficiency on the first color light.

Further, Table 1 describes table data of phase ranges (π is used as a unit in Table 1) for the liquid crystal grating to adjust different color light based on thicknesses of different liquid crystal layers along the direction perpendicular to the plane on which the first substrate is located. The first color light being the red light (R) is used as an example, and the center wavelength of the first color light is 639 nm. Table 1 further describes the corresponding maximum phase adjustment ranges of green light (G) and blue light (B) based on the thicknesses of different liquid crystal layers along the direction perpendicular to the plane on which the first substrate is located, where the center wavelength of the green light is 532 nm, and the center wavelength of the blue light is 457 nm. The thicknesses of different liquid crystal layers along the direction perpendicular to the plane on which the first substrate is located are normalized data. It can be seen from Table 1 that as the thicknesses of different liquid crystal layers decrease, the phase range of light of the same wavelength that is adjusted by the liquid crystal grating also decreases. Based on that the wavelength dependence of a refractive index difference (that is, Δn) of birefringence of the liquid crystal molecules corresponding to different color light is ignored, since the center wavelength of the red light is less than the center wavelength of the blue light and the center wavelength of the green light, for the liquid crystal layer of the same thickness, the larger the wavelength, the smaller the phase range of the light beams adjusted by the liquid crystal grating. In this way, the first color light being the red light is used as an example, and it is considered that the phase adjustment ranges of the green light and the blue light each require to be greater than 2π, the liquid crystal grating 10 may be set to satisfy $$1.7\pi < \frac{2\pi \times \Delta n_1 \times d}{\lambda_1},$$

that is, $0.85\lambda_1 < \Delta n_1 \times d$. Meanwhile, referring to FIG. 2, when the phase is 1.7π, the diffraction efficiency of the liquid crystal grating 10 on the first color light is 88%. Therefore, when the diffraction efficiency of the first color light, and the phase range of another color light adjusted by the liquid crystal grating are comprehensively considered, the phase range of the first color light adjusted by the liquid crystal grating may be set to satisfy that $$1.7\pi < \frac{2\pi \times \Delta n_1 \times d}{\lambda_1} < 1.9\pi,$$

that is, $0.85\lambda_1 < \Delta n_1 \times d < 0.95\lambda_1$. In this way, the diffraction efficiency of the first color light can be ensured to be higher than 80%, the blue light and the green light cannot be affected, and the response speed of the liquid crystal grating can also be increased. In an embodiment, the liquid crystal grating may be set to satisfy that $$\frac{2\pi \times \Delta n_1 \times d}{\lambda_1} = 1.8\pi.$$

It can be seen from FIG. 2 that when the maximum phase adjusted by the liquid crystal grating on the first color light is 1.8π, the diffraction efficiency of the liquid crystal grating 10 on the first color light is 93%. Meanwhile, as learned from Table 1, compared with the 90% thickness of the liquid crystal layer when the liquid crystal grating satisfies that $$\frac{2\pi \times \Delta n_1 \times d}{\lambda_1} = 2\pi,$$

the thickness of the liquid crystal layer is reduced by 10% so that the response speed of the liquid crystal grating can be increased, and the diffraction efficiency of the first color light can also be ensured to be higher than 90%.

TABLE 1

| | Thickness of the liquid crystal layer | | | | | |
|---|---|---|---|---|---|---|
| | 100% | 95% | 90% | 85% | 80% | 75% |
| Wavelength | Phase adjustment range/π | | | | | |
| B 457 nm | 2.80 | 2.66 | 2.52 | 2.38 | 2.24 | 2.10 |
| G 532 nm | 2.40 | 2.28 | 2.16 | 2.04 | 1.92 | 1.80 |
| R 639 nm | 2.00 | 1.90 | 1.80 | 1.70 | 1.60 | 1.50 |
| Time for ascending and descending | 100% | 90% | 81% | 72% | 64% | 56% |

Further, with continued reference to Table 1, the time for ascending and descending refers to the time for the liquid crystal molecules to flip, which is normalized herein and is positively proportional to the square of the thickness of the liquid crystal layer, that is, the smaller the thickness of the liquid crystal layer, the smaller the time for the liquid crystal molecules to flip, in other words, the faster the flipping speed of the liquid crystal molecules is, the larger the response speed of the liquid crystal grating can be.

In an implementation, the first color light is the green light. The maximum phase adjustable by the liquid crystal grating 10 on the green light is less than 2π. For the liquid crystal layer 12 of the same thickness, the larger the wavelength, the smaller the phase range for the liquid crystal grating to adjust the light beams. The maximum phase adjustable by the liquid crystal grating 10 on the red light is less than 2π. The maximum phase adjustable by the liquid crystal grating 10 on the blue light may be set to be greater than 2π. The adjustable maximum phase is numerically equal to the phase adjustment range.

In an embodiment, with continued reference to FIG. 1, the light beams further include second color light. The liquid crystal grating 10 satisfies that $k_1 \times \lambda_2 < \Delta n_2 \times d$ and $\lambda_2 < \lambda_1$, where $\Delta n_2$ denotes a refractive index difference of birefringence of the liquid crystal molecules corresponding to the second color light, $\lambda_2$ denotes a center wavelength of the second color light, and $k_1$ denotes a parameter greater than or equal to 1. The center wavelength of the second color light is different from the center wavelength of the first color light.

The center wavelength of the second color light is less than the center wavelength of the first color light, when the liquid crystal grating 10 performs the phase adjustment on the second color light, the maximum phase may be denoted as $$\frac{2\pi \times \Delta n_2 \times d}{\lambda_2};$$

the phase range adjusted by the liquid crystal grating 10 on the second color light needs to be greater than 2π, that is, $$k_1 \times 2\pi < \frac{2\pi \times \Delta n_2 \times d}{\lambda_2},$$

where $k_1$ is the parameter greater than or equal to 1. Further, it may be determined that the liquid crystal grating 10 satisfies that $k_1 \times \lambda_2 < \Delta n_2 \times d$. In this way, when the maximum phase adjusted by the liquid crystal grating 10 on the second color light may be ensured to be greater than 2π, the liquid crystal grating 10 can form the linear phase gradient from 0 to 2π by a proper voltage selection, thereby achieving 100% diffraction efficiency and improving the display effect.

In an embodiment, the light beams further include third color light. The liquid crystal grating satisfies that $k_2 \times \lambda_3 < \Delta n_3 \times d$ and $k_1 < k_2$, where $\Delta n_3$ denotes a refractive index difference of birefringence of the liquid crystal molecules corresponding to the third color light, $\lambda_3$ denotes a center wavelength of the third color light, and $k_2$ denotes a parameter greater than or equal to 1. The center wavelength of the third color light is different from either the center wavelength of the first color light or the center wavelength of the second color light.

The center wavelength of the third color light is less than the center wavelength of the first color light, when the liquid crystal grating 10 performs the phase adjustment on the third color light, the maximum phase may be denoted as $$\frac{2\pi \times \Delta n_3 \times d}{\lambda_3},$$

and the phase range adjusted by the liquid crystal grating 10 on the third color light needs to be greater than 2π, that is, $$k_2 \times 2\pi < \frac{2\pi \times \Delta n_3 \times d}{\lambda_3},$$

where $k_2$ is the parameter greater than or equal to 1. Further, it may be determined that the liquid crystal grating 10 satisfies that $k_2 \times \lambda_2 < \Delta n_3 \times d$. In this way, when it is ensured that the maximum phase adjusted by the liquid crystal grating 10 on the third color light is greater than 2π, the liquid crystal grating 10 can form the linear phase gradient from 0 to 2π by a proper voltage selection, thereby achieving 100% diffraction efficiency and improving the display effect.

In an embodiment, with continued reference to FIG. 1, the liquid crystal grating 10 satisfies that $$\frac{\Delta n_1 \times d}{\lambda_1} > \frac{\lambda_3}{\Delta n_3 \times d},$$

and $$\frac{\lambda_2}{\Delta n_2} > \frac{\lambda_3}{\Delta n_3}.$$

Table 2 describes the values of $$\frac{\Delta n_1 \times d}{\lambda_1}$$

corresponding to the first color light, the values of $$\frac{\lambda_2}{\Delta n_2 \times d}$$

corresponding to the second color light and the values of $$\frac{\lambda_3}{\Delta n_3 \times d}$$

corresponding to the third color light under the thicknesses d of different liquid crystal layers along the direction perpendicular to the plane on which the first substrate is located. It can be seen from Table 2 that under the same $$d, \frac{\Delta n_1 \times d}{\lambda_1} > \frac{\lambda_3}{\Delta n_3 \times d},$$

and $$\frac{\lambda_2}{\Delta n_2 \times d} > \frac{\lambda_3}{\Delta n_3 \times d},$$

that is, $$\frac{\lambda_2}{\Delta n_2} > \frac{\lambda_3}{\Delta n_3}.$$

TABLE 2

| d(μm) | $\Delta n_1 \times d/\lambda_1$ | $\lambda_2/\Delta n_2 \times d$ | $\lambda_3/\Delta n_3 \times d$ |
|---|---|---|---|
| 2.5 | 0.81 | 0.96 | 0.75 |
| 2.6 | 0.85 | 0.92 | 0.72 |
| 2.7 | 0.88 | 0.88 | 0.70 |
| 2.8 | 0.91 | 0.85 | 0.67 |
| 2.9 | 0.94 | 0.82 | 0.65 |
| 3 | 0.98 | 0.80 | 0.63 |
| 3.1 | 1.01 | 0.77 | 0.61 |
| 3.2 | 1.04 | 0.75 | 0.59 |
| 3.3 | 1.07 | 0.72 | 0.57 |
| 3.4 | 1.11 | 0.70 | 0.55 |
| 3.5 | 1.14 | 0.68 | 0.54 |
| 3.6 | 1.17 | 0.66 | 0.52 |
| 3.7 | 1.20 | 0.65 | 0.51 |

It is to be noted that Table 2 merely exemplifies some values of d, but the value of dis not limited herein.

In any of the preceding embodiments, the first color light is the red light, the second color light is the green light, and the third color light is the blue light. The center wavelength corresponding to the red light is greater than the center wavelength corresponding to the green light, and the center wavelength corresponding to the green light is greater than the center wavelength corresponding to the blue light. The influence of different wavelengths on Δn is ignored, from the formula of $$\frac{2\pi \times \Delta n \times d}{\lambda},$$

it can be learned that the maximum phase adjustable by the liquid crystal grating is positively proportional to d and is inversely proportional to the wavelength. In this manner, for the liquid crystal grating of the thickness of a fixed cell, the phase range adjusted by the liquid crystal grating on the red light is less than the phase range adjusted by the liquid crystal grating on the green light, and the phase range adjusted by the liquid crystal grating on the green light is less than the phase range adjusted by the liquid crystal grating on the blue light. In this way, when the liquid crystal grating satisfies that $\Delta n_1 \times d < \lambda_1$, the response speed of the liquid crystal grating can be increased, and a relatively large influence on the green light and the blue light can also be avoided.

Unless otherwise specified, the following embodiments are described using an example in which the first color light is the red light, the second color light is the green light, and the third color light is the blue light.

In any of the preceding embodiments, $\Delta n_1$, $\Delta n_2$ and $\Delta n_3$ are each greater than 0.2.

With continued reference to FIG. 1, the material of the liquid crystal layer 12 in the liquid crystal grating 10 may be set according to actual situations, which is not limited herein. $\Delta n_1$, $\Delta n_2$ and $\Delta n_3$ may be the same or different. Considering that different wavelengths may also affect Δn, $\Delta n_1$, $\Delta n_2$ and $\Delta n_3$ may have different values.

Figures 3, 4, 5:
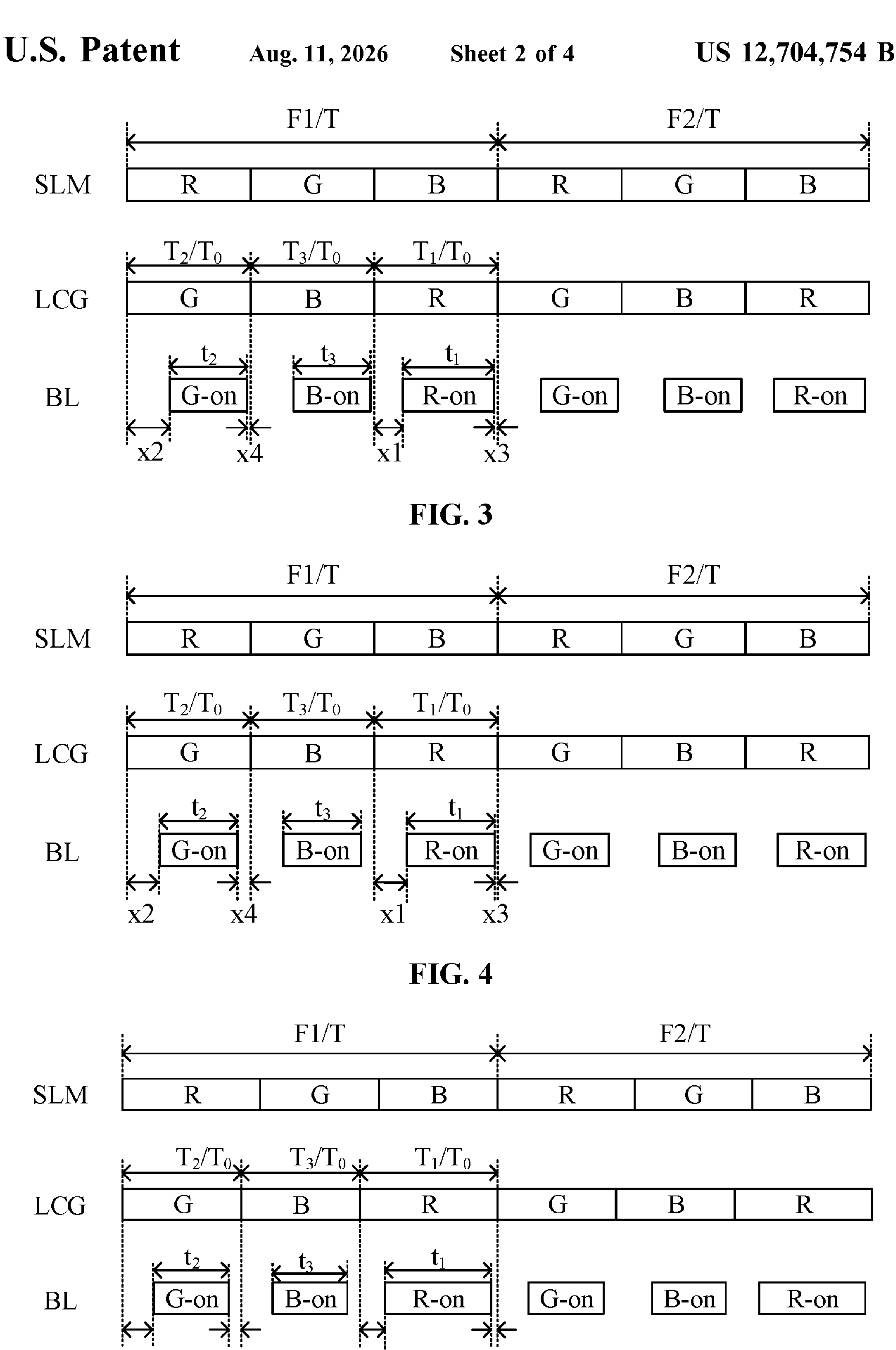
FIG. 3 is a drive timing diagram of a liquid crystal grating according to an embodiment of the present disclosure.
FIG. 4 is another drive timing diagram of a liquid crystal grating according to an embodiment of the present disclosure.
FIG. 5 is another drive timing diagram of a liquid crystal grating according to an embodiment of the present disclosure.

FIG. 3 is a drive timing diagram of a liquid crystal grating according to an embodiment of the present disclosure. In conjunction with FIGS. 1 and 3, the first color light is located in a first pulse period $t_1$, and the second color light is located in a second pulse period $t_2$. The duration of the first pulse period $t_1$ is greater than the duration of the second pulse period $t_2$ within one modulation cycle of the liquid crystal grating 10.

With continued reference to FIGS. 1 and 2, the maximum phase range for the liquid crystal grating 10 to modulate the first color light is less than the maximum phase range for the liquid crystal grating 10 to modulate the second color light, and the adjustable maximum phase is positively proportional to the diffraction efficiency so that the diffraction efficiency of the first color light can be less than the diffraction efficiency of the second color light. In this way, the duration of the first pulse period $t_1$ may be set to be greater than the duration of the second pulse period $t_2$ within one modulation cycle of the liquid crystal grating 10 so that the duration for the first color light to enter human eyes can be increased, the brightness value of the first color light can be increased, and the degree of reduction in the brightness of an image due to the reduction in the diffraction efficiency of the liquid crystal grating on the first color light can be compensated for, thereby improving the display effect.

In an embodiment, the modulation cycle T includes multiple subframes $T_0$, and one subframe $T_0$ is a duration in which a light beam of one color is projected to a single eye. The multiple subframes $T_0$ include a first subframe $T_1$ for modulating the first color light and a second subframe $T_2$ for modulating the second color light. The first pulse period $t_1$ is located within the first subframe $T_1$, and the second pulse period $t_2$ is located within the second subframe $T_2$. The spacing x1 between the start moment of the first pulse period $t_1$ and the start moment of the first subframe $T_1$ is less than or equal to the spacing x2 between the start moment of the second pulse period $t_2$ and the start moment of the second subframe $T_2$; and/or the spacing x3 between the end moment of the first pulse period $t_1$ and the end moment of the first subframe $T_1$ is less than or equal to the spacing x4 between the end moment of the second pulse period $t_2$ and the end moment of the second subframe $T_2$.

It is to be understood that FIG. 3 merely illustrates the drive timing of one spatial light modulator (SLM) and one liquid crystal grating (LCG). In an actual driving process, different SLMs or different LCGs load different driving signals, and the timings for loading the different signals are the same, so the drive schematic merely illustrates one SLM and one LCG. FIG. 3 exemplifies the timing diagram of two image frames. The two image frames may be understood as that the first frame is the left-eye image and denoted as F1, and the second frame is the right-eye image and denoted as F2. After scanning, the human eyes may observe a complete three-dimensional image. The duration corresponding to the drive timing of one image frame is one modulation cycle T. The first row and the second row respectively denote the timing of the SLM and the timing of the LCG. R, G and B in the first row refer to a period in which a driving voltage is applied to a red sub-pixel in the spatial light modulator, a period in which a driving voltage is applied to a green sub-pixel in the spatial light modulator and a period in which a driving voltage is applied to a blue sub-pixel in the spatial light modulator, respectively. R, G and B in the second row refer to a period in which the liquid crystal grating modulates the red light, a period in which the liquid crystal grating modulates the green light and a period in which the liquid crystal grating modulates the blue light, respectively. Since the liquid crystal grating does not have a color resistance structure, a light beam to be transmitted each time needs to be modulated once. Therefore, for an RGB color light beam, the modulation frequency of the liquid crystal grating is 3 times that of the spatial light modulator. The modulation cycle T includes three subframes $T_0$. One subframe $T_0$ is the period in which the light beam of one color is projected to the single eye. Multiple subframes $T_0$ include the first subframe $T_1$ for modulating the first color light and the second subframe $T_2$ for modulating the second color light.

With continued reference to FIG. 3, R-on, G-on and B-on respectively denote periods in which a backlight (BL) module emits red, green and blue light beams. Considering that liquid crystals need response time, R-on is later than the scanning period of the SLM for the R light beam, that is, in FIG. 3, the first R-on corresponds to the scanning period for the first R light beam in the scanning timing of the SLM, the second G-on corresponds to the scanning period for the first G light beam, and the second B-on corresponds to the scanning period for the first B light beam. Moreover, the SLM includes pixel design, and the R light beam does not pass through the green sub-pixel and the blue sub-pixel, so a time difference may exist between backlight illumination time and SLM scanning.

The first color light is the red light and the second color light is the green light, the first pulse period $t_1$ is located within the first subframe $T_1$ for modulating the first color light, and the second pulse period $t_2$ is located within the second subframe $T_2$ for modulating the second color light. Since the duration of the first pulse period $t_1$ is greater than the duration of the second pulse period $t_2$, the configuration cases for the first pulse period $t_1$ and the second pulse period $t_2$ include multiple cases. That is, the spacing x1 between the start moment of the first pulse period $t_1$ and the start moment of the first subframe $T_1$ is less than or equal to the spacing x2 between the start moment of the second pulse period $t_2$ and the start moment of the second subframe $T_2$; and/or the spacing x3 between the end moment of the first pulse period $t_1$ and the end moment of the first subframe $T_1$ is less than or equal to the spacing x4 between the end moment of the second pulse period $t_2$ and the end moment of the second subframe $T_2$.

In an embodiment, FIG. 3 exemplifies the timing diagram that when the durations of the first subframe $T_1$ and the second subframe $T_2$ are the same, the spacing x3 between the end moment of the first pulse period $t_1$ and the end moment of the first subframe $T_1$ is equal to the spacing x4 between the end moment of the second pulse period $t_2$ and the end moment of the second subframe $T_2$, and the spacing x1 between the start moment of the first pulse period $t_1$ and the start moment of the first subframe $T_1$ is less than the spacing x2 between the start moment of the second pulse period $t_2$ and the start moment of the second subframe $T_2$.

In another embodiment, FIG. 4 is another drive timing diagram of a liquid crystal grating according to an embodiment of the present disclosure. As shown in FIG. 4, in the case where the durations of the first subframe $T_1$ and the second subframe $T_2$ are the same, the spacing x1 between the start moment of the first pulse period $t_1$ and the start moment of the first subframe $T_1$ is equal to the spacing x2 between the start moment of the second pulse period $t_2$ and the start moment of the second subframe $T_2$, and the spacing x3 between the end moment of the first pulse period $t_1$ and the end moment of the first subframe $T_1$ is less than the spacing x4 between the end moment of the second pulse period $t_2$ and the end moment of the second subframe $T_2$.

In addition, when the durations of the first subframe $T_1$ and the second subframe $T_2$ are the same, in other embodiments, the spacing x1 between the start moment of the first pulse period $t_1$ and the start moment of the first subframe $T_1$ may be less than the spacing x2 between the start moment of the second pulse period $t_2$ and the start moment of the second subframe $T_2$, and the spacing x3 between the end moment of the first pulse period $t_1$ and the end moment of the first subframe $T_1$ may be less than the spacing x4 between the end moment of the second pulse period $t_2$ and the end moment of the second subframe $T_2$.

In another embodiment, FIG. 5 is another drive timing diagram of a liquid crystal grating according to an embodiment of the present disclosure. As shown in FIG. 5, in the case where the duration of the first subframe $T_1$ is greater than the duration of the second subframe $T_2$, the spacing x1 between the start moment of the first pulse period $t_1$ and the start moment of the first subframe $T_1$ is less than the spacing x2 between the start moment of the second pulse period $t_2$ and the start moment of the second subframe $T_2$, and the spacing x3 between the end moment of the first pulse period $t_1$ and the end moment of the first subframe $T_1$ is less than the spacing x4 between the end moment of the second pulse period $t_2$ and the end moment of the second subframe $T_2$. However, this is not limited herein. In other embodiments, the spacing x1 between the start moment of the first pulse period $t_1$ and the start moment of the first subframe $T_1$ may be less than the spacing x2 between the start moment of the second pulse period $t_2$ and the start moment of the second subframe $T_2$, and the spacing x3 between the end moment of the first pulse period $t_1$ and the end moment of the first subframe $T_1$ may be equal to the spacing x4 between the end moment of the second pulse period $t_2$ and the end moment of the second subframe $T_2$. Alternatively, the spacing x1 between the start moment of the first pulse period $t_1$ and the start moment of the first subframe $T_1$ may be equal to the spacing x2 between the start moment of the second pulse period $t_2$ and the start moment of the second subframe $T_2$, and the spacing x3 between the end moment of the first pulse period $t_1$ and the end moment of the first subframe $T_1$ may be less than the spacing x4 between the end moment of the second pulse period $t_2$ and the end moment of the second subframe $T_2$. This may be set according to actual situations.

Figures 6, 7, 8:
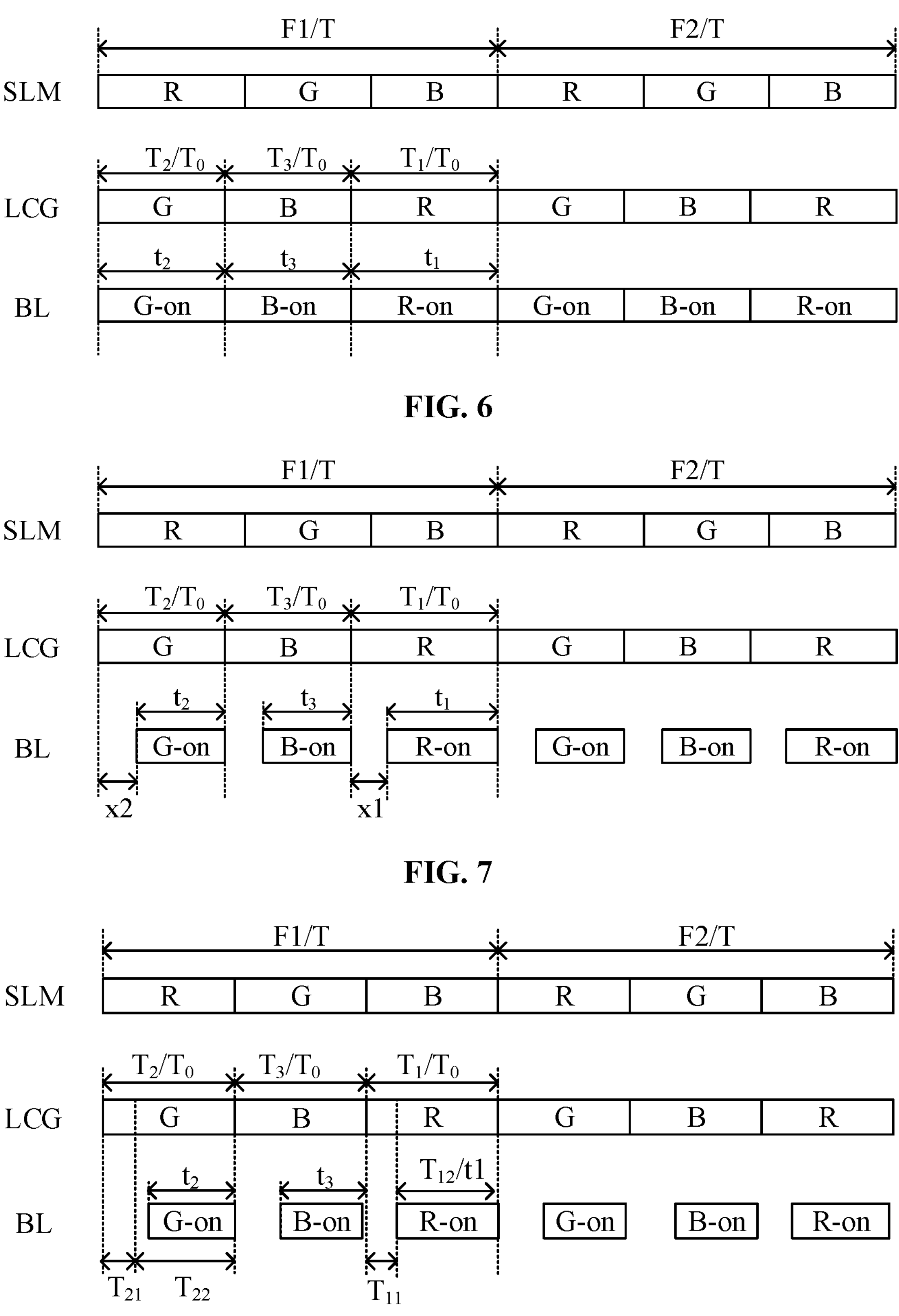
FIG. 6 is another drive timing diagram of a liquid crystal grating according to an embodiment of the present disclosure.
FIG. 7 is another drive timing diagram of a liquid crystal grating according to an embodiment of the present disclosure.
FIG. 8 is another drive timing diagram of a liquid crystal grating according to an embodiment of the present disclosure.

In another embodiment, FIG. 6 is another drive timing diagram of a liquid crystal grating according to an embodiment of the present disclosure. As shown in FIG. 6, in the case where the duration of the first subframe $T_1$ is greater than the duration of the second subframe $T_2$, the spacing x1 between the start moment of the first pulse period $t_1$ and the start moment of the first subframe $T_1$ is equal to the spacing x2 between the start moment of the second pulse period $t_2$ and the start moment of the second subframe $T_2$, and x1=x2=0; and the spacing x3 between the end moment of the first pulse period $t_1$ and the end moment of the first subframe $T_1$ is equal to the spacing x4 between the end moment of the second pulse period $t_2$ and the end moment of the second subframe $T_2$, and x3=x4=0. It is to be understood that the start moment of the first pulse period $t_1$ is the same as the start moment of the first subframe $T_1$, the end moment of the first pulse period $t_1$ is the same as the end moment of the first subframe $T_1$, the start moment of the second pulse period $t_2$ is the same as the start moment of the second subframe $T_2$, and the end moment of the second pulse period $t_2$ is the same as the end moment of the second subframe $T_2$.

In an embodiment, FIG. 7 is another drive timing diagram of a liquid crystal grating according to an embodiment of the present disclosure. Referring to FIGS. 6 and 7, within the same modulation cycle T, the end moment of the first pulse period $t_1$ is the same as the end moment of the first subframe $T_1$, and the end moment of the second pulse period $t_2$ is the same as the end moment of the second subframe $T_2$.

If the spacing x3 between the end moment of the first pulse period $t_1$ and the end moment of the first subframe $T_1$ is greater than 0, the time for modulating the red light in the liquid crystal grating is wasted. Similarly, if the spacing x4 between the end moment of the second pulse period $t_2$ and the end moment of the second subframe $T_2$ is greater than 0, the time for modulating the green light in the liquid crystal grating is also wasted. In this manner, within the same modulation cycle T, the spacing x1 between the start moment of the first pulse period $t_1$ and the start moment of the first subframe $T_1$ is set to be equal to the spacing x2 between the start moment of the second pulse period $t_2$ and the start moment of the second subframe $T_2$, and x1 and x2 may each be equal to 0 (referring to FIG. 6) or may also be each greater than 0 (referring to FIG. 7); the end moment of the first pulse period $t_1$ is the same as the end moment of the first subframe $T_1$, and the end moment of the second pulse period $t_2$ is the same as the end moment of the second subframe $T_2$ so that $t_1>t_2$. In this manner, not only can the duration for the first color light to enter the human eyes and the brightness value of the first color light be increased, but also the degree of reduction in the brightness of the image due to the reduction in the diffraction efficiency of the liquid crystal grating on the first color light can be compensated for, thereby improving the display effect. In addition, the time for modulating the light beams in the liquid crystal grating is prevented from being wasted.

In an embodiment, FIG. 8 is another drive timing diagram of a liquid crystal grating according to an embodiment of the present disclosure. Referring to FIG. 8, the first subframe $T_1$ includes a first write period $T_{11}$ and a first stable period $T_{12}$ that are arranged chronologically. The second subframe $T_2$ includes a second write period $T_{21}$ and a second stable period $T_{22}$ that are arranged chronologically. The duration of the first write period $T_{11}$ is equal to the duration of the second write period $T_{21}$, and the duration of the first stable period $T_{12}$ and the duration of the second stable period $T_{22}$ are each equal to the duration of the first pulse period $t_1$.

It is to be understood that the first write period $T_{11}$ and the second write period $T_{21}$ are periods in which a corresponding modulation voltage is written into a drive electrode (that is, the first electrode 14 in FIG. 1) of the liquid crystal grating, and the first stable period $T_{12}$ and the second stable period $T_{22}$ are time periods in which the liquid crystals within the liquid crystal grating are deflected in response to the modulation voltage and remain stable after the deflection, where the backlight is turned on in the stable periods.

With continued reference to FIG. 8, the duration of the first write period $T_{11}$ is the same as the duration of the second write period $T_{21}$, and the duration of the first stable period $T_{12}$ is the same as the duration of the second stable period $T_{22}$, that is, the duration of the first subframe $T_1$ and the duration of the second subframe $T_2$ are the same. In this case, the duration of the first pulse period $t_1$ and the duration of the first stable period $T_{12}$ are set to be the same so that the backlight module can continuously supply the first color light in the first stable period $T_{12}$, and the duration of the first pulse period $t_1$ is greater than the duration of the second pulse period $t_2$ so that the duration of the second pulse period $t_2$ is less than the duration of the second stable period $T_{22}$. FIG. 8 merely exemplifies an implementation in which the start moment of the second pulse period $t_2$ is later than the start moment of the second stable period $T_{22}$, and the end moment of the second pulse period $t_2$ is the same as the end moment of the second stable period $T_{22}$, but this is not limited herein.

In an embodiment, referring to FIG. 8, the first color light is located in the first pulse period $t_1$, and the third color light is located in a third pulse period $t_3$. The duration of the first pulse period $t_1$ is greater than the duration of the third pulse period $t_3$ within one modulation cycle T of the liquid crystal grating.

Using the third color light being blue as an example, with continued reference to FIGS. 3 to 8, the third pulse period $t_3$ may be less than or equal to the second pulse period $t_2$, which is not limited herein. The configuration mode of the third pulse period $t_3$ may be referred to the configuration mode of the second pulse period $t_2$. The multiple subframes $T_0$ include a third subframe $T_3$ for modulating the third color light, the first pulse period $t_1$ is located within the first subframe $T_1$, and the third pulse period $t_3$ is located within the third subframe $T_3$. The spacing between the start moment of the first pulse period $t_1$ and the start moment of the first subframe $T_1$ is less than or equal to the spacing between the start moment of the third pulse period $t_3$ and the start moment of the third subframe $T_3$; and/or the spacing between the end moment of the first pulse period $t_1$ and the end moment of the first subframe $T_1$ is less than or equal to the spacing between the end moment of the third pulse period $t_3$ and the end moment of the third subframe $T_3$. The implementation may be referred to the configuration mode of the second pulse period $t_2$ in FIGS. 3 to 8, and details are not repeated herein. In this way, the duration of the first pulse period $t_1$ is set to be greater than the duration of the third pulse period $t_3$ within one modulation cycle T of the liquid crystal grating so that the duration for the first color light to enter the human eyes can also be increased, the brightness value of the first color light can also be increased, and the degree of reduction in the brightness of the image due to the reduction in the diffraction efficiency of the liquid crystal grating on the first color light can also be compensated for, thereby improving the display effect.

Figure 9:
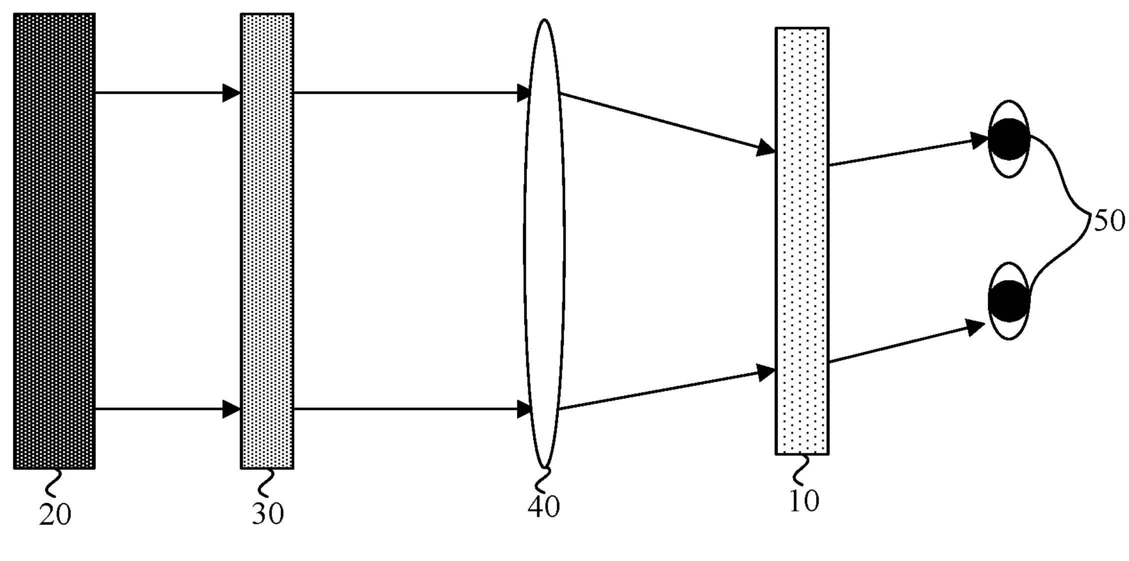
FIG. 9 is a diagram illustrating the structure of a display device according to an embodiment of the present disclosure.

Based on the same inventive concept, an embodiment of the present disclosure further provides a display device. FIG. 9 is a diagram illustrating the structure of a display device according to an embodiment of the present disclosure. As shown in FIG. 9, the display device 100 includes a light resource 20 and at least one liquid crystal grating 10 according to any one of the preceding embodiments. The light source 20 is configured to chronologically emit each light beam of coherent light beams of multiple colors.

The light source 20 is the above-mentioned backlight module. For a colorful display, the light resource 20 is configured to chronologically emit each coherent light beam of different colors, such as red light, green light and blue light.

It is to be noted that the display device 100 may include one or more liquid crystal gratings 10, and this is not limited herein. When the display device 100 includes multiple liquid crystal gratings 10, the multiple liquid crystal gratings 10 may be disposed to have different diffraction directions. For example, when the display device 100 includes three liquid crystal gratings 10, the diffraction directions may be 0°, 45° and −45°, respectively.

Figure 10:
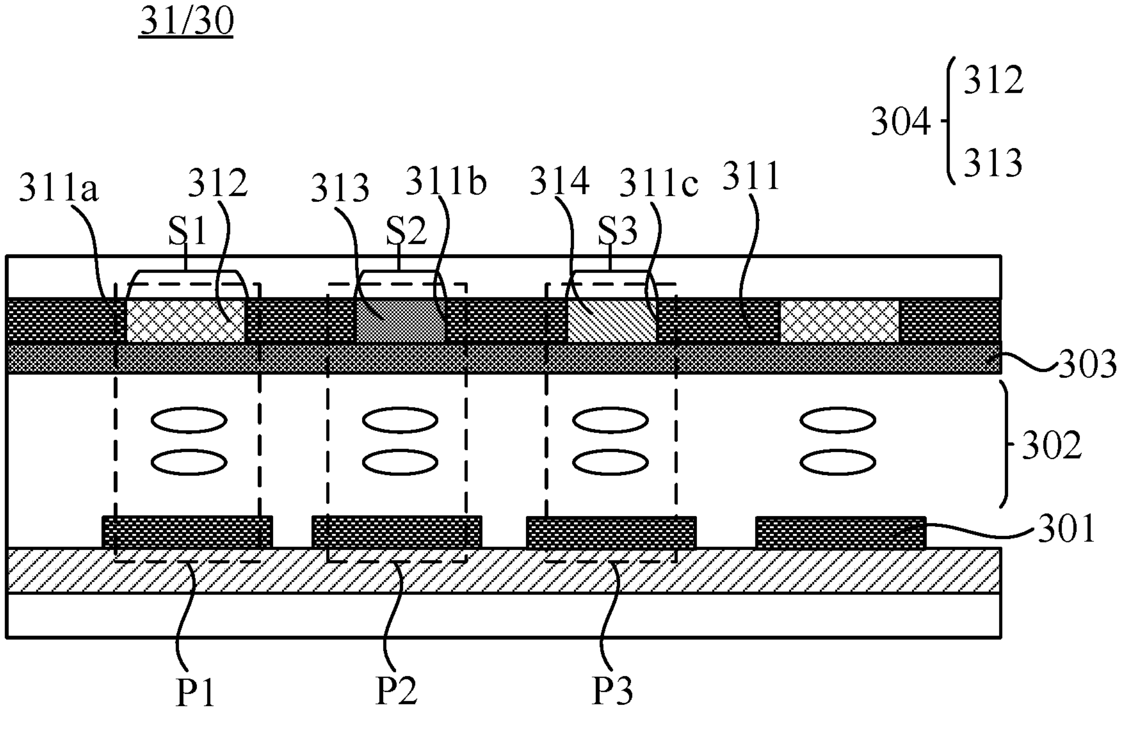
FIG. 10 is a cross-sectional diagram of a spatial light modulator according to an embodiment of the present disclosure.

In an embodiment, FIG. 10 is a cross-sectional diagram of a spatial light modulator according to an embodiment of the present disclosure. In conjunction with FIGS. 9 and 10, the display device 100 further includes a spatial light modulator 30 located between the light resource 20 and the liquid crystal grating 10 and configured to perform a phase modulation and/or an amplitude modulation on the light beams. The light beams further include second color light, and the center wavelength of the second color light is less than the center wavelength of the first color light. The spatial light modulator 30 includes at least one liquid crystal module 31. A liquid crystal module 31 includes a first sub-pixel P1 and a second sub-pixel P2, the first sub-pixel P1 is configured to transmit the first color light, and the second sub-pixel P2 is configured to transmit the second color light. The at least one liquid crystal module 31 satisfies that the transmittance of the first color light within the first sub-pixel P1 is greater than the transmittance of the second color light within the second sub-pixel P2.

With continued reference to FIG. 9, the display device 100 further includes a field lens 40, and the spatial light modulator 30 may include two liquid crystal modules 31. One liquid crystal module 31 is configured to adjust the phases of the light beams, and the other liquid crystal module 31 is configured to adjust the amplitudes of the light beams. FIG. 9 merely exemplifies one liquid crystal module 31. The field lens 40 is configured to converge the light beams to a position window of the human eyes 50 so that the human eyes 50 can see an image displayed by the display device. In other words, after being modulated by the spatial light modulator 30, the light beams can be incident on the liquid crystal grating 10 through the field lens 40 so that the left-eye image and the right-eye image can be formed.

Using the first color light being the red light and the second color light being the green light as an example, with continued reference to FIG. 10, the liquid crystal module 31 may be a liquid crystal panel structure. The structure of the liquid crystal module is not limited herein. FIG. 10 merely illustrates an example. The liquid crystal module 31 includes the first sub-pixel P1 and the second sub-pixel P2, the first sub-pixel P1 is configured to transmit the first color light, and the second sub-pixel P2 is configured to transmit the second color light. A sub-pixel may include a pixel electrode layer 301, a liquid crystal film layer 302, a common electrode layer 303 and a color resistance layer 304 that are sequentially disposed, but this is not limited herein. Further, the center wavelength of the second color light is less than the center wavelength of the first color light so that the phase modulation range of the liquid crystal grating for the second color light can be greater than the phase modulation range of the liquid crystal grating for the first color light, and thus, the diffraction efficiency of the liquid crystal grating on the first color light can be less than the diffraction efficiency of the liquid crystal grating on the second color light. In this way, the at least one liquid crystal module 31 is set to satisfy that the transmittance of the first color light within the first sub-pixel P1 is greater than the transmittance of the second color light within the second sub-pixel P2. As a result, in the case where the backlight intensity is constant, the intensity of the red light can be increased after the red light transmits through the spatial light modulator 30, so that the intensity of the red light emitted by the display device can be increased, and the defect of the reduction in the brightness of a red light image due to the reduction in the diffraction efficiency of the liquid crystal grating can be compensated for, thereby improving the display effect.

In an embodiment, with continued reference to FIG. 10, the liquid crystal module 31 further includes a black matrix 311. The black matrix 311 is provided with a first opening 311*a* and a second opening 311*b*. The first opening 311*a* corresponds to the first sub-pixel P1. The second opening 311*b* corresponds to the second sub-pixel P2. The area of the first opening 311*a* is greater than the area of the second opening 311*b*.

The area of the first opening 311*a* is denoted as the first area S1, and the area of the second opening 311*b* is denoted as the second area S2. Different first areas S1 denote different pixel opening ratios of the first sub-pixel P1. Different second areas S2 denote different pixel opening ratios of the second sub-pixel P2. The larger the area of an opening, the larger the opening ratio of a sub-pixel, the more the transmitted light, and the larger the light-emitting brightness of the sub-pixel. In this manner, the area of the first opening 311*a* is set to be greater than the area of the second opening 311*b*, that is, S1 is greater than S2, so that the intensity of the first color light emitted by the first sub-pixel P1 can be greater than the intensity of the second color light emitted by the second sub-pixel P2, thereby compensating for the defect of the reduction in the brightness of the red light image due to the reduction in the diffraction efficiency of the liquid crystal grating, and improving the display effect.

It is to be noted that FIG. 10 merely exemplifies the sectional structure diagram of the liquid crystal module 31. The shapes of the first opening 311*a* and the second opening 311*b* may be set according to actual situations, which are not limited herein. Using the first opening 311*a* and the second opening 311*b* being rectangular structures as an example, FIG. 10 exemplifies a width difference between the first opening 311*a* and the second opening 311*b* to denote that the area of the first opening 311*a* is different from the area of the second opening 311*b*, and S1 is greater than S2.

In an embodiment, with continued reference to FIG. 10, the liquid crystal module 31 further includes a first color resistance 312 and a second color resistance 313, and the transmittance of the first color resistance 312 to the first color light is greater than the transmittance of the second color resistance 313 to the second color light.

A photoresist material coated on the first color resistance 312 may be different from a photoresist material coated on the second color resistance 313, or the concentration of particles filling the first color resistance 312 may be different from the concentration of particles filling the second color resistance 313, or the thickness of the first color resistance 312 may be different from the thickness of the second color resistance 313 so that the transmittance of the first color resistance 312 to the first color light can be different from the transmittance of the second color resistance 313 to the second color light, and the transmittance of the first color resistance 312 to the first color light can be ensured to be greater than the transmittance of the second color resistance 313 to the second color light. The configuration mode may be set according to actual situations and is not limited herein.

The first color resistance 312 is configured to transmit the red light, and the second color resistance 313 is configured to transmit the green light. Materials or structures of the first color resistance 312 and the second color resistance 313 may be different and are not limited herein. Therefore, the transmittance of the first color resistance 312 to the first color light is greater than the transmittance of the second color resistance 313 to the second color light so that the intensity of the red light after transmitting through the spatial light modulator 30 can be increased, the intensity of the red light emitted by the display device can be increased, and the defect of the reduction in the brightness of the red light image due to the reduction in the diffraction efficiency of the liquid crystal grating can be compensated for, thereby improving the display effect.

In an embodiment, with continued reference to FIG. 10, the light beams further include third color light, and the center wavelength of the third color light is less than the center wavelength of the second color light. The liquid crystal module 31 further includes a third sub-pixel P3, the third sub-pixel P3 is configured to transmit the third color light; and the at least one liquid crystal module 31 satisfies that the transmittance of the first sub-pixel P1 is greater than the transmittance of the third sub-pixel P3.

The first sub-pixel P1 may be a red sub-pixel, and the first color light is the red light. The second sub-pixel P2 may be a green sub-pixel, and the second color light may be the green light. The third sub-pixel P3 may be a blue sub-pixel, and the third color light may be the blue light.

The third color light is the blue light, and the center wavelength of the third color light is less than the center wavelength of the first color light so that the phase modulation range of the liquid crystal grating for the third color light can be greater than that for the first color light, and the diffraction efficiency of the liquid crystal grating on the first color light can be less than the diffraction efficiency of the liquid crystal grating on the third color light. In this manner, the transmittance of the first sub-pixel P1 may be set to be greater than the transmittance of the third sub-pixel P3, in the case where the backlight intensity is constant, the intensity of the red light after transmitting through the spatial light modulator 30 can be increased so that the intensity of the red light emitted by the display device can be increased, and the defect of the reduction in the brightness of the red light image due to the reduction in the diffraction efficiency of the liquid crystal grating can be compensated for, thereby improving the display effect.

Further, with continued reference to FIG. 10, the black matrix 311 is further provided with a third opening 311*c*. The third opening 311*c* corresponds to the third sub-pixel P3. The area of the first opening 311*a* is greater than the area of the third opening 311*c*.

The shape of the third opening 311*c* may be set according to actual situations and is not limited herein.

Using the first opening 311*a* and the third opening 311*c* being rectangular structures as an example, the area of the third opening 311*c* is denoted as the third area S3. FIG. 10 exemplifies a width difference between the first opening 311*a* and the third opening 311*c* to denote that the area of the first opening 311*a* is different from the area of the third opening 311*c*, and S1 is greater than S3. The area of the first opening 311*a* is greater than the area of the third opening 311*c* so that the intensity of the first color light emitted by the first sub-pixel P1 can be greater than the intensity of the third color light emitted by the third sub-pixel P3 to compensate for the defect of the reduction in the brightness of the red light image due to the reduction in the diffraction efficiency of the liquid crystal grating, thereby improving the display effect. Further, with continued reference to FIG. 10, the liquid crystal module 31 further includes a third color resistance 314, and the transmittance of the first color resistance 312 to the first color light is greater than the transmittance of the third color resistance 314 to the third color light.

A photoresist material coated on the first color resistance 312 may be different from a photoresist material coated on the third color resistance 314, or the concentration of particles filling the first color resistance 312 may be different from the concentration of particles filling the third color resistance 314, or the thickness of the first color resistance 312 may be different from the thickness of the third color resistance 314 so that the transmittance of the first color resistance 312 to the first color light can be different from the transmittance of the third color resistance 314 to the third color light, and the transmittance of the first color resistance 312 to the first color light is ensured to be greater than the transmittance of the third color resistance 314 to the third color light. The configuration mode may be set according to actual situations and is not limited herein.

Therefore, in the case where the backlight intensity is constant, compared with the second sub-pixel P2 and the third sub-pixel P3, the intensity of the red light after transmitting through the spatial light modulator 30 can be increased by increasing the area of the first opening 311*a* corresponding to the first sub-pixel P1, and/or increasing the transmittance of the first color resistance 312 to the first color light, thus the intensity of the red light emitted by the display device can be increased to compensate for the defect of the reduction in the brightness of the red light image due to the reduction in the diffraction efficiency of the liquid crystal grating, and the display effect is improved.

It is to be noted that the preceding are merely alternative embodiments of the present disclosure and the technical principles used therein. It is to be understood by those skilled in the art that the present disclosure is not limited to the embodiments described herein. Those skilled in the art can make various apparent modifications, adaptations, combinations and substitutions without departing from the scope of the present disclosure. Therefore, though the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A liquid crystal grating, configured to modulate incident light beams of a plurality of colors, wherein the light beams comprise first color light;

the liquid crystal grating comprises a first substrate, a liquid crystal layer and a second substrate, the liquid crystal layer is located between the first substrate and the second substrate, and the liquid crystal layer comprises a plurality of liquid crystal molecules; and the liquid crystal grating satisfies:

$$0.85\lambda_1 < \Delta n_1 \times d < 0.95\lambda_1$$

wherein $\Delta n_1$ denotes a refractive index difference of birefringence of the plurality of liquid crystal molecules corresponding to the first color light, d denotes a thickness of the liquid crystal layer along a direction perpendicular to a plane on which the first substrate is located, and $\lambda_1$ denotes a center wavelength of the first color light.

2. The liquid crystal grating according to claim 1, wherein the light beams further comprise second color light; and the liquid crystal grating satisfies:

$$k_1 \times \lambda_2 < \Delta n_2 \times d, \text{ and}$$

$$\lambda_2 < \lambda_1,$$

wherein $\Delta n_2$ denotes a refractive index difference of birefringence of the plurality of liquid crystal molecules corresponding to the second color light, $\lambda_2$ denotes a center wavelength of the second color light, and $k_1$ denotes a parameter greater than or equal to 1.

3. The liquid crystal grating according to claim 2, wherein the light beams further comprise third color light; and the liquid crystal grating satisfies:

$$k_2 \times \lambda_3 < \Delta n_3 \times d, \text{ and } k_1 < k_2,$$

wherein $\Delta n_3$ denotes a refractive index difference of birefringence of the plurality of liquid crystal molecules corresponding to the third color light, $\lambda_3$ denotes a center wavelength of the third color light, and $k_2$ denotes a parameter greater than or equal to 1.

4. The liquid crystal grating according to claim 3, wherein the following is satisfied:

$$\frac{\Delta n_1 \times d}{\lambda_1} > \frac{\lambda_3}{\Delta n_3 \times d}, \text{ and}$$

$$\frac{\lambda_2}{\Delta n_2} > \frac{\lambda_3}{\Delta n_3}.$$

5. The liquid crystal grating according to claim 3, wherein the first color light, the second color light and the third color light are red light, green light and blue light, respectively.

6. The liquid crystal grating according to claim 3, wherein $\Delta n_1$, $\Delta n_2$ and $\Delta n_3$ are each greater than 0.2.

7. The liquid crystal grating according to claim 2, wherein the first color light is located in a first pulse period, and the second color light is located in a second pulse period; and a duration of the first pulse period is greater than a duration of the second pulse period within one modulation cycle of the liquid crystal grating.

8. The liquid crystal grating according to claim 7, wherein the modulation cycle comprises a plurality of subframes, one subframe of the plurality of subframes is a period in which a light beam of one color is projected to a single eye, and the plurality of subframes comprise a first subframe for modulating the first color light and a second subframe for modulating the second color light;

the first pulse period is located within the first subframe, and the second pulse period is located within the second subframe; and a spacing between a start moment of the first pulse period and a start moment of the first subframe is less than or equal to a spacing between a start moment of the second pulse period and a start moment of the second subframe; and/or a spacing between an end moment of the first pulse period and an end moment of the first subframe is less than or equal to a spacing between an end moment of the second pulse period and an end moment of the second subframe.

9. The liquid crystal grating according to claim 8, wherein in a same one modulation cycle, the end moment of the first pulse period is the same as the end moment of the first subframe, and the end moment of the second pulse period is the same as the end moment of the second subframe.

10. The liquid crystal grating according to claim 8, wherein the first subframe comprises a first write period and a first stable period that are arranged chronologically, and the second subframe comprises a second write period and a second stable period that are arranged chronologically; and a duration of the first write period is equal to a duration of the second write period, and a duration of the first stable period and a duration of the second stable period are each equal to the duration of the first pulse period.

11. The liquid crystal grating according to claim 3, wherein the first color light is located in a first pulse period, and the third color light is located in a third pulse period; and a duration of the first pulse period is greater than a duration of the third pulse period within one modulation cycle of the liquid crystal grating.

12. The liquid crystal grating according to claim 1, wherein 2 μm≤d≤5 μm.

13. A display device, comprising a light source, at least one liquid crystal grating, and a spatial light modulator located between the light source and the at least one liquid crystal grating, wherein the at least one liquid crystal grating is configured to modulate incident light beams of a plurality of colors, wherein the light beams comprise first color light; each of the at least one liquid crystal grating comprises a first substrate, a liquid crystal layer and a second substrate, the liquid crystal layer is located between the first substrate and the second substrate, and the liquid crystal layer comprises a plurality of liquid crystal molecules; and each of the at least one liquid crystal grating satisfies: $\Delta n_1 \times d < \lambda_1$, wherein $\Delta n_1$ denotes a refractive index difference of birefringence of the plurality of liquid crystal molecules corresponding to the first color light, d denotes a thickness of the liquid crystal layer along a direction perpendicular to a plane on which the first substrate is located, and $\lambda_1$ denotes a center wavelength of the first color light;

wherein the light source is configured to chronologically emit each light beam of the coherent light beams of the plurality of colors;

wherein the spatial light modulator is configured to perform at least one of a phase modulation or an amplitude modulation on the light beams;

the light beams further comprise second color light, and a center wavelength of the second color light is less than the center wavelength of the first color light;

the spatial light modulator comprises at least one liquid crystal module, each of the at least one liquid crystal module comprises a first sub-pixel and a second sub-pixel, the first sub-pixel is configured to transmit the first color light, and the second sub-pixel is configured to transmit the second color light; and the at least one liquid crystal module satisfies that a transmittance of the first color light within the first sub-pixel is greater than a transmittance of the second color light within the second sub-pixel.

14. The display device according to claim 13, wherein one of the at least one liquid crystal module further comprises a black matrix, the black matrix is provided with a first opening and a second opening, the first opening corresponds to the first sub-pixel, the second opening corresponds to the second sub-pixel, and an area of the first opening is greater than an area of the second opening.

15. The display device according to claim 13, wherein one of the at least one liquid crystal module further comprises a first color resistance and a second color resistance, and a transmittance of the first color resistance to the first color light is greater than a transmittance of the second color resistance to the second color light.

16. The display device according to claim 13, wherein the light beams further comprise third color light, and a center wavelength of the third color light is less than the center wavelength of the second color light;

each of the at least one liquid crystal module further comprises a third sub-pixel configured to transmit the third color light; and the at least one liquid crystal module satisfies that a transmittance of the first sub-pixel is greater than a transmittance of the third sub-pixel.

17. The display device according to claim 13, wherein the following is satisfied:

$$0.85\lambda_1 < \Delta n_1 \times d < 0.95\lambda_1.$$

18. The display device grating according to claim 17, wherein the light beams further comprise third color light; and the liquid crystal grating satisfies that $k_2 \times \lambda_3 < \Delta n_3 \times d$, and $k_1 < k_2$, wherein $\Delta n_3$ denotes a refractive index difference of birefringence of the plurality of liquid crystal molecules corresponding to the third color light, $\lambda_3$ denotes a center wavelength of the third color light, and $k_2$ denotes a parameter greater than or equal to 1.

19. A display device, comprising a light source and at least one liquid crystal grating, wherein the at least one liquid crystal grating is configured to modulate incident light beams of a plurality of colors, wherein the light beams comprise first color light; each of the at least one liquid crystal grating comprises a first substrate, a liquid crystal layer and a second substrate, the liquid crystal layer is located between the first substrate and the second substrate, and the liquid crystal layer comprises a plurality of liquid crystal molecules; and each of the at least one liquid crystal grating satisfies: $0.85\lambda_1 < \Delta n_1 \times d < 0.95\lambda_1$, wherein $\Delta n_1$ denotes a refractive index difference of birefringence of the plurality of liquid crystal molecules corresponding to the first color light, d denotes a thickness of the liquid crystal layer along a direction perpendicular to a plane on which the first substrate is located, and $\lambda_1$ denotes a center wavelength of the first color light;

wherein the light source is configured to chronologically emit each light beam of the coherent light beams of the plurality of colors.

20. The display device according to claim 19, wherein the light beams further comprise third color light; and the liquid crystal grating satisfies that $k_2 \times \lambda_3 < \Delta n_3 \times d$, and $k_1 < k_2$, wherein $\Delta n_3$ denotes a refractive index difference of birefringence of the plurality of liquid crystal molecules corresponding to the third color light, $\lambda_3$ denotes a center wavelength of the third color light, and $k_2$ denotes a parameter greater than or equal to 1.

* * * * *